United States Patent
Murgatroyd et al.

(10) Patent No.: US 8,562,242 B2
(45) Date of Patent: Oct. 22, 2013

(54) REINFORCED SPLINES AND THEIR MANUFACTURE

(75) Inventors: David Philip Murgatroyd, Reading Berkshire (GB); Stephen Mark Flitcroft, Basingstoke Hampshire (GB); Renny Neil Moss, Ashtead Surrey (GB); Stephen John Kyle-Henney, Leatherhead Surrey (GB)

(73) Assignee: Tisics Limited, Hampshire (GB)

(*) Notice: Subject to any disclaimer, the term of this patent is extended or adjusted under 35 U.S.C. 154(b) by 946 days.

(21) Appl. No.: 12/227,818

(22) PCT Filed: May 31, 2007

(86) PCT No.: PCT/GB2007/050306
§ 371 (c)(1),
(2), (4) Date: Oct. 1, 2009

(87) PCT Pub. No.: WO2007/138360
PCT Pub. Date: Dec. 6, 2007

(65) Prior Publication Data
US 2010/0014913 A1    Jan. 21, 2010

(30) Foreign Application Priority Data
May 31, 2006    (GB) .................................. 0610694.2

(51) Int. Cl.
*B25G 3/28* (2006.01)
*G03F 7/00* (2006.01)

(52) U.S. Cl.
USPC ................... 403/359.1; 428/293.4; 403/359.6

(58) Field of Classification Search
USPC ........... 428/293.4; 228/164; 403/359.1–359.6
See application file for complete search history.

(56) References Cited

U.S. PATENT DOCUMENTS

| | | | | |
|---|---|---|---|---|
| 3,650,357 A | * | 3/1972 | Nelson et al. | 188/71.5 |
| 4,383,594 A | | 5/1983 | Correll et al. | 188/71.5 |
| 4,499,156 A | * | 2/1985 | Smith et al. | 228/121 |
| 4,867,644 A | | 9/1989 | Wright et al. | 416/230 |
| 4,896,815 A | * | 1/1990 | Rosenthal et al. | 228/120 |
| 5,260,137 A | * | 11/1993 | Rosenthal et al. | 428/608 |
| 5,425,494 A | * | 6/1995 | Rosenthal et al. | 228/124.5 |
| 6,025,062 A | * | 2/2000 | Krenkel et al. | 428/293.4 |
| 6,723,279 B1 | * | 4/2004 | Withers et al. | 419/27 |
| 2005/0086789 A1 | | 4/2005 | Twigg | 29/505 |
| 2009/0268995 A1 | * | 10/2009 | Ide et al. | 384/121 |
| 2011/0220280 A1 | * | 9/2011 | DiPietro | 156/285 |

OTHER PUBLICATIONS

Larsen J. M. et al.; "An Evaluation of Fiber-Reinforced Titanium Matrix Composites for Advanced High-Temperature Aerospace Applications"; Metallurgical and Materials Transactions A: Physical Metallurgy & Materials Science, ASM International, Materials Park, OH, US; vol. 26A, No. 12, Dec. 1, 1995; pp. 3211-3223.

* cited by examiner

*Primary Examiner* — Victor MacArthur
(74) *Attorney, Agent, or Firm* — Watov & Kipnes, P.C.; Kenneth Watov

(57) ABSTRACT

A spline structure, in the form of an aeronautical brake drive bar, has wheel attachment points at its ends for engaging a wheel rim. Each wheel carries a regularly spaced series of these drive bars for engaging friction discs carried by the wheel hub. The main body of each brake drive bar is formed from titanium internally reinforced by composite blocks each comprising a bundle of silicon carbide fibers contained in a matrix that is diffusion bonded within the main body. Other spline structures can be formed in a similar manner.

9 Claims, 3 Drawing Sheets

REINFORCED SPLINES AND THEIR MANUFACTURE

RELATED APPLICATIONS

The present application claims priority from PCT International Application No. PCT/GB2007/050306, filed 31 May 2007, which claims priority from Great Britain Patent Application No. 0610694.2, filed 31 May 2006.

FIELD OF THE INVENTION

This invention relates to the reinforcement of a spline structure which term is used generally herein to denote any component provided with one or more splines, drive keys, rotor keys and drive bars. More particularly, but not exclusively, the invention is concerned with drive bars for use in aircraft brakes.

BACKGROUND TO THE INVENTION

Spline structures are used to transmit torque between two components, particularly when a degree of relative movement is to be accommodated in a direction orthogonal to the direction of the torque.

Multi-plate devices are commonly used as brakes or clutches in transport and machinery, and as aircraft brakes. These devices rely on the application of an engagement force to press a series of friction discs together to transmit torque.

When used as a brake, such friction discs usually comprise intercalated sets, one set being rotor discs secured by splines for rotation with a rotor, whilst the other set are stator discs held by splines carried by a stator. The two sets of splines permit the discs to slide axially into and out of rubbing engagement. One or more actuators are carried by the stator and are arranged to press the outermost discs axially towards each other, thereby forcing all of the discs into mutual rubbing engagement so that braking torque is applied by the stator to the rotor. The stator is typically an axle or a torque tube linked with an axle integral with the landing gear, and the rotor is a wheel.

When used as a clutch, the overall arrangement is the same except that the stator is replaced by a second rotor so that engagement of the friction discs transmits torque between the two rotors.

As the friction discs are pressed together, the friction between them generates a significant amount of heat and the discs can reach a temperature of up to 3,0000° Centigrade in the case of a large aircraft breaking at full landing speed. This heat is initially absorbed by the disks which conduct the heat into the rotor and stator in the case of a brake, or into the two rotors in the case of a clutch. This heating is particularly intense in the splines which are also required to transfer the torque generated by the disks. The splines are consequently required to take very large forces in multi-point bending at high temperatures and their reliability is clearly safety critical. For this reason, the splines have to be formed from a high performance material. Very few materials are capable of achieving this performance, and typically high strength steels, stainless steels and nickel alloys are used. Although these special materials enable the required performance to be achieved, they are dense and add significant weight to an aeronautical brake system.

Throughout this specification and claims the term "metal" is used to include both metals and metal alloys, and named metals are used to include their alloys. Light metals, ceramics and polymer composites are being used increasingly and other transport and machinery to reduce weight and provide improved performance and efficiency. Titanium offers the great strength at high operational temperatures but insufficient strength at the very high temperatures developed in some applications, particularly aeronautical brake systems for heavy aircraft, unless the spline structures are made larger than the equivalent steel or nickel spline structures. Nickel provides greater strength at high operational temperatures but is a much heavier metal.

Heavy and high performance aircraft are often provided with multi-plate brakes of which the outer peripheries of the rotor friction discs engage the wheel via an annular series of individual splines known as drive bars. Each drive bar has its ends attached to the inside of the wheel rim by wheel attachment points at its ends. Two different types of attachment are commonly used, typically a radial bolt securing one end of the drive bar to the inside of the wheel rim, and a generally cylindrical pin extending longitudinally along an axis parallely spaced from the axis of rotation and engaging a corresponding aperture formed inside the wheel rim. In this manner each drive bar is securely connected to the wheel whilst being able to expand longitudinally and being readily removable for servicing or replacement.

If such drive bars are made from titanium, their transverse dimensions must be increased to provide the requisite strength, and this reduces the volume between the wheel rim and the axle splines with the result that the volume of the brake discs has to be decreased. Aircraft brake manufacturers are increasingly paid by the number of landings made on a set of brake discs, this being generally proportional to the volume of the discs. The selection of titanium for making drive bars has the advantage of significant weight reduction when compared with conventional steel or nickel alloys due its lower density. Although each drive bar is quite small, it should be borne in mind that each wheel can have many drive bars and large aircraft can have 20 wheels. In addition to the weight reduction achieved, the rotational energy of each wheel is also reduced enabling the brakes to decelerate the airframe more rapidly for a given braking force, or allowing a lower braking force to achieve the same deceleration.

It is an object of this invention to provide a reinforced drive bar that is of lower weight than conventional drive bars made of steel or nickel alloys, but does not significantly reduce the volume available for the friction discs. It is another object of this invention to provide reinforced spline structures from a range of metals for varying purposes.

SUMMARY OF THE INVENTION

According to one aspect of the invention a spline structure defines at least one metal spline that is internally reinforced by at least one composite block comprising a bundle of silicon carbide fibres that are contained in a matrix that is diffusion bonded to the spline.

Each composite block is preferably premade with the matrix diffusion bonded within a metal sheath that is diffusion bonded to the spline. The metal sheath may be formed from a titanium alloy. Each spline and each matrix may also be formed of titanium alloy. The titanium alloy may be ASTM Grade 5 or 9.

Each spline may be internally re-enforced by a plurality of said composite blocks, at least two of said composite blocks being positioned orthogonally to each other.

The spline structure may be in the form of an aeronautical brake drive bar having wheel attachment points at its ends. The composite block preferably extends longitudinally between the wheel attachment points and is orientated to transmit torque to the wheel attachment points.

One of the wheel attachment points is preferably a pin extending longitudinally from one end of the drive bar, and the composite block extends longitudinally of the drive bar into the pin.

One of the wheel attachment points is preferably an aperture through one end of the drive bar, and the composite block extends longitudinally of the drive bar and along both longitudinal sides of the aperture.

The aeronautical brake drive bar is preferably internally reinforced by at least three of said composite blocks which are arranged longitudinally side-by-side, but with the outer two composite blocks being orthogonal to the third composite block.

Alternatively, a spline structure can be in the form of an internally or externally splined structure provided with an annular series of splines internally reinforced by respective composite blocks. The composite blocks may extend beyond the roots of the splines to provide additional reinforcement.

Each of the reinforced splines may be formed separately from a support structure and then be diffusion bonded to the support structure.

According to another aspect of the invention a method of manufacturing an internally reinforced spline structure defining at least one metal spline, comprises forming a cavity in the spline structure, arranging silicon carbide fibres within the cavity, and connecting the silicon carbide fibres to the structure by diffusion bonding.

The method may include inserting a mixture of aligned silicon carbide fibres and metal particles into the cavity, and then processing the spline structure at a sufficiently high temperature and pressure to consolidate the metal particles and the silicon carbide fibres until the silicon carbide fibres are diffusion bonded to the spline structure.

Alternatively, the method may include inserting into the cavity one or more pre-formed composite blocks each comprising a bundle of silicon carbide fibres in a matrix, and then processing the spline structure at a sufficiently high temperature and pressure until the matrix is diffusion bonded to the spline structure.

With any of these methods the cavity may be sealed and/or evacuated before the spline structure is processed.

Any of the methods may comprise inter-spacing at least some of the composite blocks with blocks or sheets on the metal prior to sealing the cavity.

BRIEF DESCRIPTION OF THE DRAWINGS

The invention will now be described, by way of example only, with reference to the accompanying drawings, in which.

DETAILED DESCRIPTION OF THE ILLUSTRATED EMBODIMENT

Figure 1:
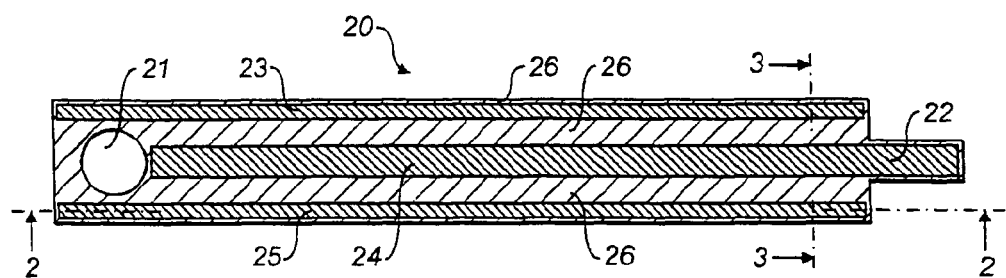
FIG. 1 is a longitudinal section through one form of reinforced drive bar taken along the line 1-1 in FIG. 2.
Figure 2:
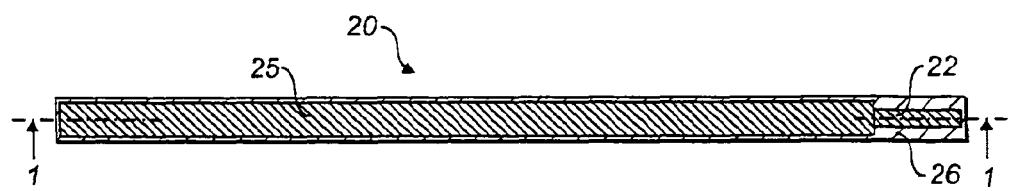
FIG. 2 is a longitudinal section taken along the line 2-2 in FIG. 1.
Figure 3:
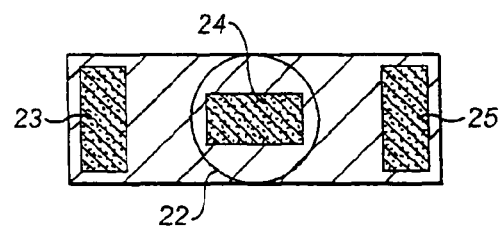
FIG. 3 is a transverse section taken along the line 3-3 in FIG. 1.

With reference to FIGS. 1, 2 and 3, a specific form of spline structure is an aeronautical brake drive bar 20 having wheel attachment points 21 and 22 at its ends. The wheel attachment point 21 is an aperture through the drive bar 20 for receiving an unshown attachment bolt that will extend radially outwards into the wheel rim. The wheel attachment point 22 is a cylindrical pin extending longitudinally from the end of the drive bar 20 that is remote from the aperture 21. This cylindrical pin 22 will engage a bush in the wheel rim. Each wheel will contain a regularly spaced annular series of these drive bars 20 for engaging the rotor friction discs. It will be noted that the axes of the aperture 21 and the cylindrical pin 22 are orthogonal whereby the brake drive bar 20 can expand and contract, due to temperature changes, without interfering with its secure attachment to the wheel. To this point the features of the brake drive bar are conventional.

As taught by this invention, the brake drive bar 20 is internally reinforced by composite blocks 23, 24 and 25, each comprising a bundle of silicon carbide fibres which are contained in a matrix that is diffusion bonded within the main body 26 of the brake drive bar 20. The main body may be formed from titanium alloy ASTM Grade 5 or 9 and the silicon carbide fibres can be manufactured in the manner taught by our European Patents EP0396332, EP0396333, EP0450760 and EP059849.

Each of the composite blocks 23, 24 and 25 can be formed in situ by machining or otherwise forming corresponding cavities in the main body 26, laying silicon carbide fibres longitudinally along each of the cavities together with a compatible matrix material, processed to form a matrix constituting the composite blocks 23, 24 and 25. In this manner the silicon carbide fibres could either be touching or preferably be completely surrounded by the matrix. The matrix material is preferably metal particles in the form of a powder, powder slurry, foil, ribbon, wire or as a coating applied directly to the silicon carbide fibres. The main body 26 and the composite blocks 23, 24 and 25 are then diffusion bonded to form an integral structure which can then be machined to the tolerances required by the brake drive bar 20. The diffusion bonding is preferably conducted under suitably high pressures and temperatures by hot isotatic pressing. Sealing and evacuating the cavity can improve the quality of the diffusion bonding.

Alternatively, and preferably the composite blocks can be premade by arranging the silicon fibres and the matrix material inside a sheath and diffusion bonding together under high pressure and temperature. The fibres are held by a combination of entrapment and chemical reaction with the matrix material. If the sheath is not diffusion compatible with the material of the main body 26, the sheath can be removed before the composite block is inserted into its cavity in the main body 26. In this case the matrix material must be diffusion compatible with the material of the main body to ensure bonding.

As shown in FIG. 3, the lateral composite blocks 23 and 25 are positioned orthogonally relative to the central orthogonal block 24 to form an I-beam reinforcement, the central block 24 extending from the aperture 21 along the entire length of the brake drive bar and into the pin 22. The lateral composite blocks 23 and 25 also extend along the full length of the brake drive bar and reinforce the sides of the aperture 21.

Figure 4:
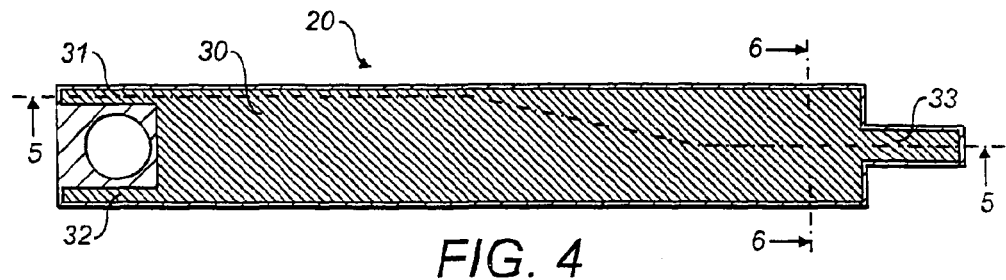
FIG. 4 is a longitudinal section through another form of reinforced drive bar taken along the line 4-4 in FIG. 5.
Figure 5:
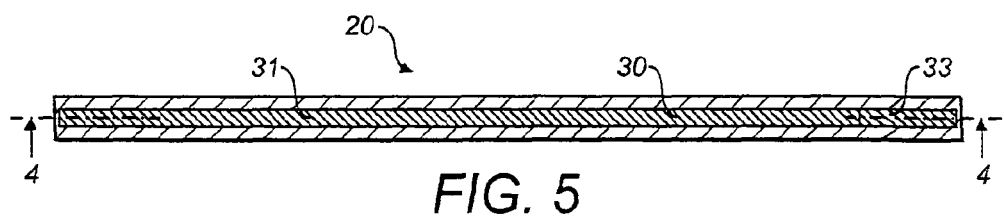
FIG. 5 is a longitudinal section taken along the line 5-5 in FIG. 4.
Figure 6:
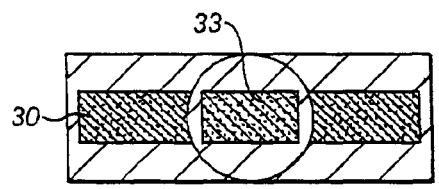
FIG. 6 is a transverse section taken along the line 6-6 in FIG. 4.

FIGS. 4, 5 and 6 illustrate a brake drive bar 20 having the same external profile as described with reference to FIGS. 1, 2 and 3, but having a different form of internal reinforcement comprising a single composite block 30 having longitudinal extensions 31 and 32 to reinforce the aperture 21, and an oppositely directed longitudinal extension 33 to reinforce the cylindrical pin 22.

Figure 7:
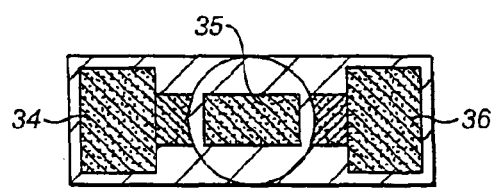
FIGS. 7 and 8 are transverse sections similar to FIG. 6 but showing different reinforcements.
Figure 8:
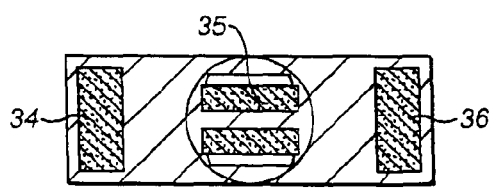

FIGS. 7 and 8 illustrate alternative arrangements of composite blocks 34, 35 and 36 as shown.

Figure 9:
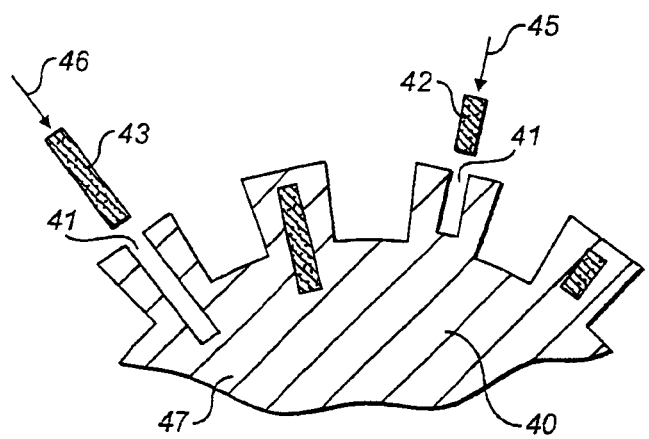
FIG. 9 is a scrap section through part of an externally splined shaft, the right hand side showing the introduction of one form of composite block, and the left hand side showing the introduction of another form of composite block.

In FIG. 9, an externally splined shaft 40 has cavities 41 machined along its splines to receive premade composite blocks 42 or 43 which are diffusion bonded in position as shown by arrows 45 and 46 respectively. The composite blocks 42 provide internal reinforcement to the splines illustrated on the right. However, the composite blocks 43 have a greater radial dimension, extending beyond the roots of the splines, and are diffusion bonded into the core 47 of the shaft 40 thereby providing greater reinforcement.

Figure 10:
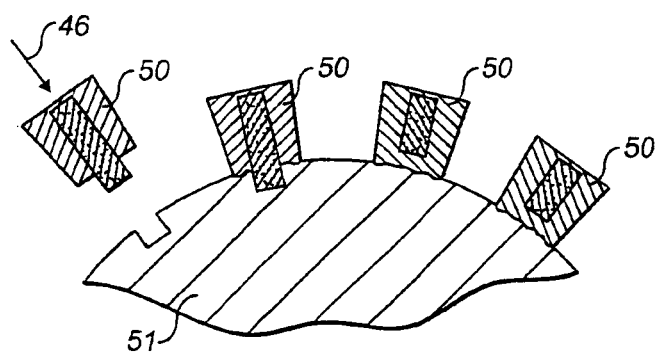
FIG. 10 is a view similar to FIG. 9 but showing the attachment of separate reinforced splines to a shaft.

FIG. 10 is similar to FIG. 9 but shows internally reinforced splines 50 that are formed separately from the shaft 51. These splines are then diffusion bonded to the shaft 51. To achieve this, the reinforced splines 50 made be located in an expendable mould or fixture to ensure correct alignment during bonding. The longer composite blocks shown on the left extend into and are diffusion bonded to the shaft 51, and also serve to locate the splines prior to bonding.

Although the described embodiments are concerned with the provision of an improved drive bar formed from titanium with silicon carbide internal reinforcement to withstand the exceptional forces and temperatures experienced within aeronautical brakes, this invention also provides reinforced splines for other environments. Provided that the metal components are compatible for diffusion bonding, the spline structure could be formed from nickel or nickel alloy with silicon carbide reinforcement for very high temperature applications. Alternatively the spline structure could be formed from aluminium, aluminium alloy, copper or copper alloys to allow high conduction of heat or electricity.

The invention claimed is:

1. A spline structure comprising at least one metal spline that is reinforced by silicon carbide, wherein each spline is internally re-enforced by a plurality of composite blocks, at least two of said composite blocks being positioned orthogonally to each other, and each composite block includes a bundle of silicon carbide fibres that are contained in a matrix that is diffusion bonded to the spline.

2. The spline structure of claim 1, further including each composite block being premade with the matrix diffusion bonded within a metal sheath that is diffusion bonded to the spline.

3. The spline structure of claim 2, wherein the metal sheath is formed from a titanium alloy.

4. The spline structure of claim 1, wherein each spline and each matrix are formed of titanium alloy.

5. An aeronautical brake drive bar having wheel attachment points at its ends wherein the drive bar comprises the spline structure of claim 1.

6. The drive bar of claim 5, wherein one of said composite blocks extends longitudinally between the wheel attachment points and is orientated to transmit torque to the wheel attachment points.

7. The drive bar of claim 6, wherein one of the wheel attachment points is a pin extending longitudinally from one end of the drive bar, and the one of said composite blocks extends longitudinally of the drive bar into the pin.

8. The drive bar of claim 5, wherein one of the wheel attachment points is an aperture through one end of the drive bar, and two of said composite blocks each extend longitudinally of the drive bar and along opposing longitudinal sides of the aperture.

9. An aeronautical drive bar comprising a spline structure, the drive bar defining wheel attachment points at its ends, said drive bar being internally reinforced by at least three composite blocks which are arranged longitudinally side-by-side, but with the outer two composite blocks being orthogonal to the third composite block, and each composite block includes a bundle of silicon carbide fibres that are contained in a matrix that is diffusion bonded to said drive bar.

* * * * *